A. T. DAWSON & G. T. BUCKHAM.
SIGHTING APPARATUS FOR ORDNANCE.
APPLICATION FILED MAY 22, 1908.
922,398.
Patented May 18, 1909.
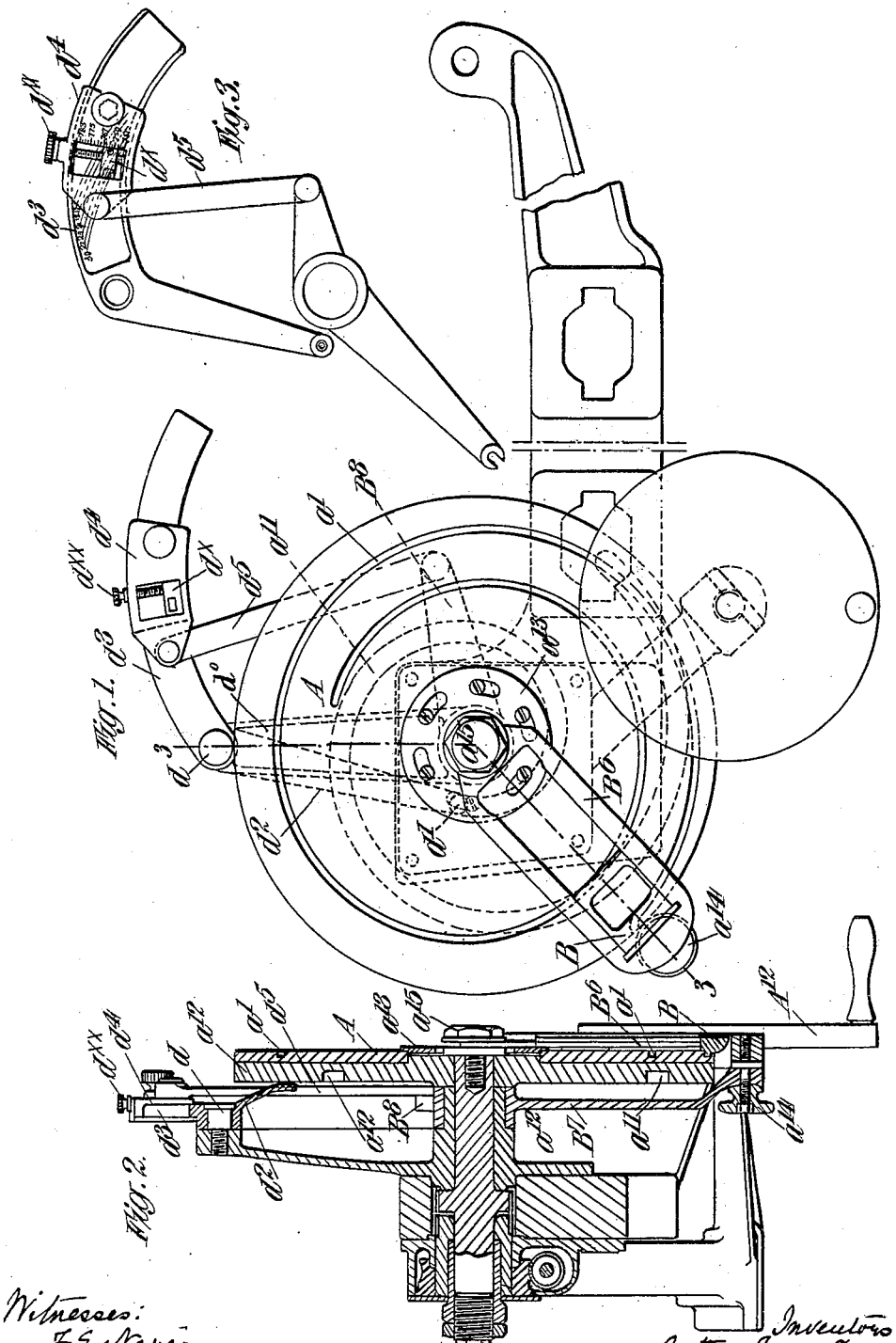

UNITED STATES PATENT OFFICE.

ARTHUR TREVOR DAWSON AND GEORGE THOMAS BUCKHAM, OF WESTMINSTER, LONDON, ENGLAND, ASSIGNORS TO VICKERS SONS & MAXIM, LIMITED, OF WESTMINSTER, ENGLAND.

SIGHTING APPARATUS FOR ORDNANCE.

No. 922,398.     Specification of Letters Patent.     Patented May 18, 1909.

Original application filed October 23, 1907, Serial No. 398,717. Divided and this application filed May 22, 1908. Serial No. 434,231.

*To all whom it may concern:*

Be it known that we, ARTHUR TREVOR DAWSON, lieutenant Royal Navy, director and superintendent of Ordnance Works, and GEORGE THOMAS BUCKHAM, engineer, both subjects of the King of Great Britain, residing at 32 Victoria street, Westminster, in the county of London, England, have invented certain new and useful Improvements relating to Sighting Apparatus for Ordnance, of which the following is a specification.

This invention relates to sighting apparatus of the kind in which there is a range dial and a pointer so arranged that in imparting angular displacement of the dial relatively to the pointer the proper elevation will be given to the sight to accord with a particular range.

We have already devised sighting apparatus in which a graduated dial is moved by hand gearing relatively to the pointer for setting the sight for different ranges, means being provided whereby in the act of setting the range dial relatively to a pointer a correction will be automatically made to compensate for alterations in the muzzle velocity and changes in the temperature of the charges by changing the position of the pointer, so that in setting the range dial a greater or less angular movement will be imparted to the dial in bringing a particular graduation or mark thereon into coincidence with the pointer. These compensating means we term a "calibrating" device.

It is the chief object of our present invention to modify the construction of the said calibrating device.

Our present invention is particularly, although not exclusively, intended for use with duplex sights of the well known cross-connected kind.

We will describe our invention with reference to the accompanying drawings, in which:—

Figures 1 to 3 illustrate the improved calibrating device in which the pointer is of the kind that moves radially across the face of the range dial during the angular displacement of the latter, the said pointer having angular movement imparted to it by the calibrating device when the hand actuated gearing is operated; Fig. 1 being a side elevation of the apparatus with the hinged sight bar and the sight proper removed; Fig. 2 a vertical section taken approximately on the line 3—3 of Fig. 1, and Fig. 3 a detail of the apparatus to an enlarged scale.

B is the pointer which is carried in a guide or frame $B^6$, and which engages with a spiral groove $a'$ formed in the face of the range dial A, so that when the dial is revolved the pointer will move radially over the face of the same. The said frame $B^6$ is connected to a radial arm $B^7$ which is co-axially arranged with respect to the range dial A so as to be free to move angularly about the axis thereof.

The calibrating device comprises the cam or spiral groove $a^{11}$ formed on or in the rear face of the range dial for actuating the roller $d'$ situated at the end of one arm $d^2$ of the bell-crank lever which is adapted to swing about an axis or bearing $d$ carried by a bracket $d^0$. The other arm $d^3$ of said bell crank lever has the sliding or adjustable block $d^4$ which is adapted to be shifted and secured in any desired position on this arm. This arm bears temperature curves (Fig. 3) which are carefully calculated for enabling the block $d^4$ to be set in the proper position thereon as required for the change in charge temperature. The radial arm $B^7$ carrying the said angularly adjustable pointer frame $B^6$ is provided with a second arm or extension $B^8$ connected by means of the link or rod $d^5$ with the sliding block $d^4$. The said block is also provided with the adjustable piece or pointer $d^x$ working adjacent to a graduated scale on the block for enabling the said adjustable piece $d^x$ to be set by the actuation of the milled head $d^{xx}$ in the proper position for effecting the corrections required for the change in muzzle velocity.

To correct for muzzle velocity and charge temperature the member $d^x$ is first set to the muzzle velocity scale and then the sliding block $d^4$ is moved along the arm $d^3$ until an index on the member $d^x$ touches the required temperature curve.

When the range dial is actuated by the hand gear $A^{12}$ in the ordinary manner to bring the desired graduation thereon into correspondence with the pointer B, the aforesaid cam or spiral groove $a^{11}$ also imparts movement to the bell crank lever $d^2$ $d^3$. This bell crank lever in turn imparts angular movement to the pointer frame $B^6$ through the said connecting link $d^5$ and the radial arm $B^8$ carrying the pointer frame, to an extent depending upon the position of the said sliding block $d^4$ on the arm $d^3$ of the bell crank lever, and the degree of rotation imparted to the range dial by the hand gear. If the block is moved inward toward the pivot $d$ of the bell crank lever, so as to bring the center of the contiguous end of the connecting link $d^5$ into coincidence with the center of the pivot $d$ of the bell crank lever, the motion imparted to the bell crank lever by the aforesaid dial cam or spiral groove $a^{11}$ will not affect the position of the pointer frame $B^6$. If, however, the sliding block be moved outward or away from the pivot $d$ of the bell crank lever, the motion imparted to the latter by the dial cam or spiral groove will be transmitted to the pointer frame through the said link $d^5$, to a greater or less extent according to the distance the sliding block has been shifted from the pivot of the bell crank lever. Thus the elevation given to the sight during the movement of the range dial in bringing the desired graduation into correspondence with the pointer will be increased to the extent to which the pointer frame is set by the calibrating device so as to automatically effect the requisite correction for the fall in the muzzle velocity and the change in charge temperature. Fig. 3 shows the calibrating device set for a muzzle velocity of 763 meter seconds and a charge temperature of 27 degrees centigrade. The said spiral groove $a^{11}$ that imparts motion to the calibrating device is preferably formed in a disk $a^{12}$ to which the dial A may be attached by means of our usual clamping ring $a^{13}$ having a circular series of keyhole slots that operate in conjunction with flanged pins or screws projecting from the said disk, so that by imparting angular movement to the clamping ring the dial can be readily disconnected. The said pointer may be secured to the radial arm by our usual clamping nut $a^{14}$ which when slightly slackened permits the pointer frame to move radially outward until clear of the nut $a^{15}$, whereupon it can be detached.

What we claim and desire to secure by Letters Patent of the United States is:—

In sighting apparatus for guns, the combination with the range dial and its index or pointer, of hand actuated means for setting the range dial with respect to the pointer and changing the elevation of the sights, means for causing said pointer to move radially across the face of the range dial during the setting of the latter, a double armed or bell crank lever of which one arm or member engages with a cam or spiral groove of the range dial, an adjustable piece mounted on the other arm or member of the said lever and connected with the pointer by means whereby the angular position of the pointer will be varied in accordance with the position of the adjustable piece and the degree of motion imparted to the range dial during the setting of the sights by the hand actuated means.

In testimony whereof we have hereunto set our hands in the presence of two subscribing witnesses this eighth day of May, 1908.

ARTHUR TREVOR DAWSON.
GEORGE THOMAS BUCKHAM.

Witnesses:
HENRY KING,
ARCHIE H. NICHOLS.